United States Patent
Yajima et al.

(10) Patent No.: US 10,427,377 B2
(45) Date of Patent: Oct. 1, 2019

(54) FILM, PACKAGING BAG USING THE FILM, AND METHOD OF IMPARTING HEAT SEALING PROPERTIES TO THE FILM

(71) Applicant: TOPPAN PRINTING CO., LTD., Tokyo (JP)

(72) Inventors: Shunsuke Yajima, Tokyo (JP); Akira Yoshifuji, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/859,229

(22) Filed: Dec. 29, 2017

(65) Prior Publication Data

US 2018/0186948 A1 Jul. 5, 2018

Related U.S. Application Data

(63) Continuation of application No. PCT/JP2016/002935, filed on Jun. 17, 2016.

(30) Foreign Application Priority Data

Jul. 7, 2015 (JP) ................. 2015-136416
Aug. 28, 2015 (JP) ................. 2015-169493
Oct. 27, 2015 (JP) ................. 2015-211035

(51) Int. Cl.

| B32B 5/14 | (2006.01) |
| B32B 27/36 | (2006.01) |
| B32B 1/02 | (2006.01) |
| B32B 27/16 | (2006.01) |
| B65D 75/26 | (2006.01) |
| C08J 5/18 | (2006.01) |
| B29C 71/02 | (2006.01) |
| B65D 65/14 | (2006.01) |
| C08J 7/12 | (2006.01) |

(52) U.S. Cl.
CPC ............... *B32B 5/147* (2013.01); *B32B 1/02* (2013.01); *B32B 5/14* (2013.01); *B32B 27/16* (2013.01); *B32B 27/36* (2013.01); *B65D 65/14* (2013.01); *B65D 75/26* (2013.01); *C08J 5/18* (2013.01); *C08J 7/08* (2013.01); *C08J 7/123* (2013.01); *B32B 2250/02* (2013.01); *B32B 2307/31* (2013.01); *B32B 2367/00* (2013.01); *B32B 2439/46* (2013.01); *C08J 2367/02* (2013.01)

(58) Field of Classification Search
CPC .. B32B 1/02; B32B 5/14; B32B 5/142; B32B 5/145; B32B 5/147; B32B 27/16; B32B 27/36
See application file for complete search history.

(56) References Cited

U.S. PATENT DOCUMENTS 4,631,155 A 12/1986 Caines
5,204,181 A * 4/1993 Suzuki ............... B32B 15/08
428/349

FOREIGN PATENT DOCUMENTS

| EP | 0 287 216 A1 | 10/1988 |
| JP | 61-181840 A | 8/1986 |
| JP | 63-308042 A | 12/1988 |
| JP | 10-139900 A | 5/1998 |
| JP | 2016-000796 A | 1/2016 |
| WO | WO-2011/148992 A1 | 12/2011 |
| WO | WO-2013/001606 A1 | 1/2013 |
| WO | WO-2013/076934 A1 | 5/2013 |
| WO | WO-2015/190110 A1 | 12/2015 |

OTHER PUBLICATIONS

Office Action in JP 2015-136416, dated Jun. 21, 2016, 7 pages.
International Search Report and Written Opinion for PCT/JP2016/002935, dated Sep. 13, 2016, 10 pages.

* cited by examiner

*Primary Examiner* — Walter Aughenbaugh
(74) *Attorney, Agent, or Firm* — Foley & Lardner LLP

(57) ABSTRACT

A film having heat sealing properties, a packaging bag using the film and a method of imparting heat sealing properties to the film are provided. The film is made up of a single layer of biaxially stretched polyester or made up of a laminate including the layer of biaxially stretched polyester at a surface. The layer of biaxially stretched polyester includes a non-sealing portion having no heat sealing properties, and a sealing portion having heat sealing properties due to irradiation of laser light and exhibiting lower crystallinity compared to that of the non-sealing portion.

7 Claims, 8 Drawing Sheets

FIG.1
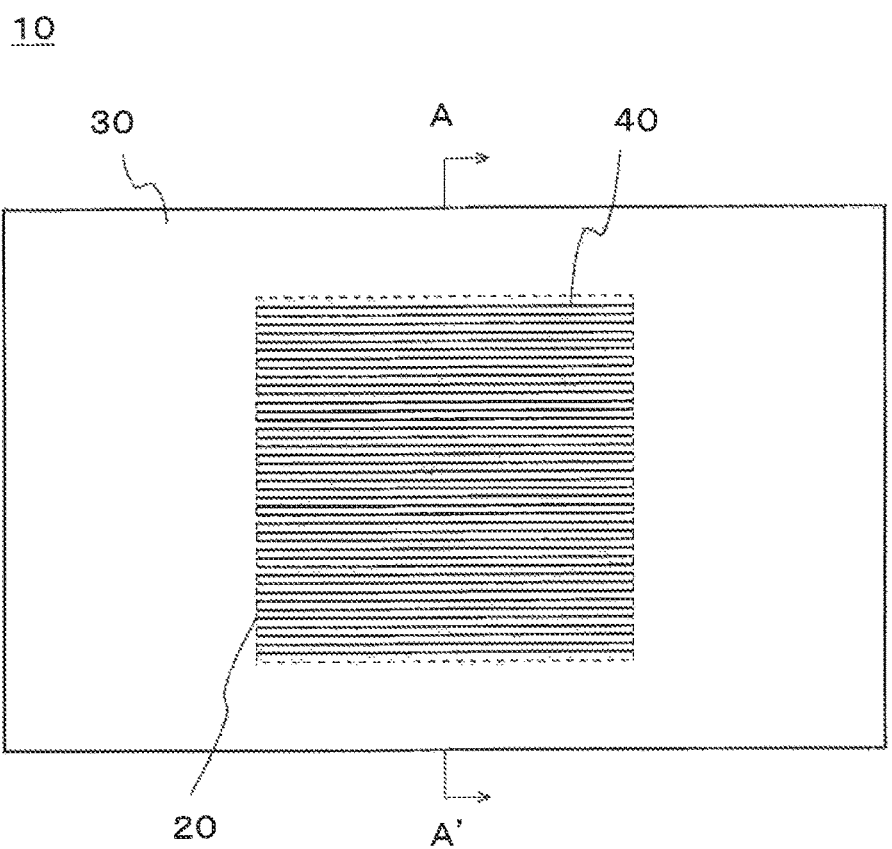
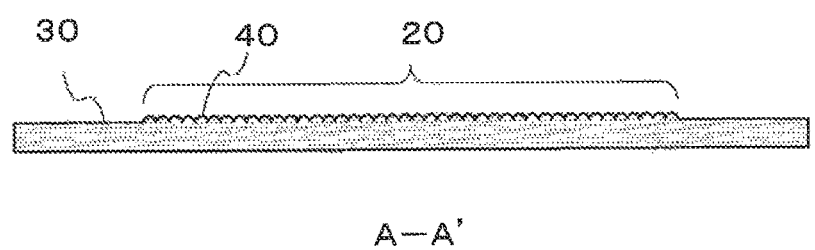
A–A'

FIG.2
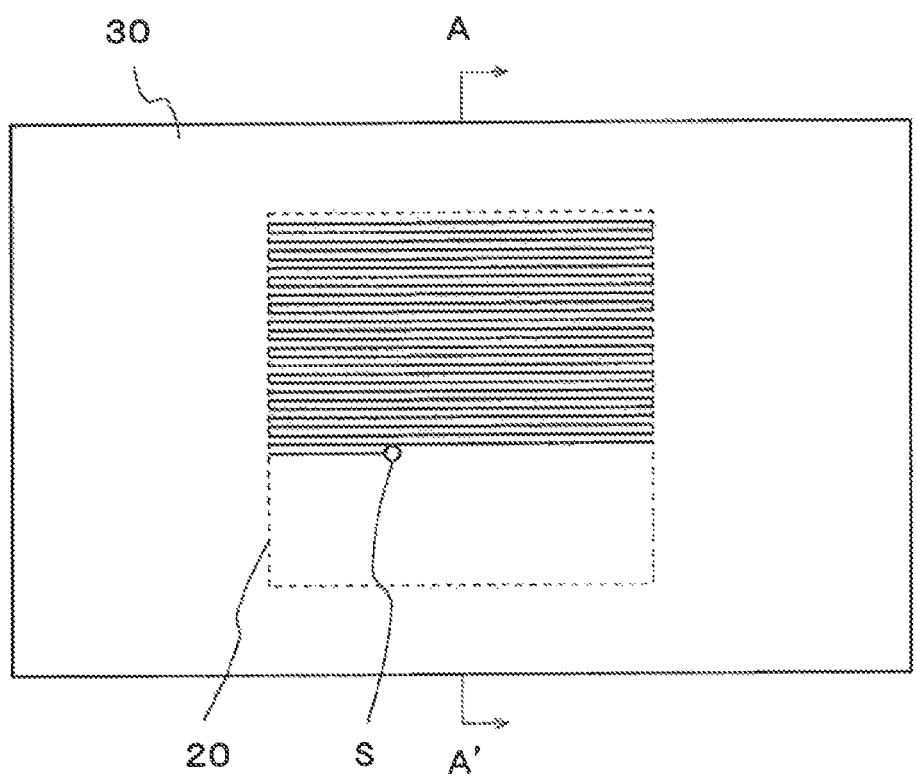
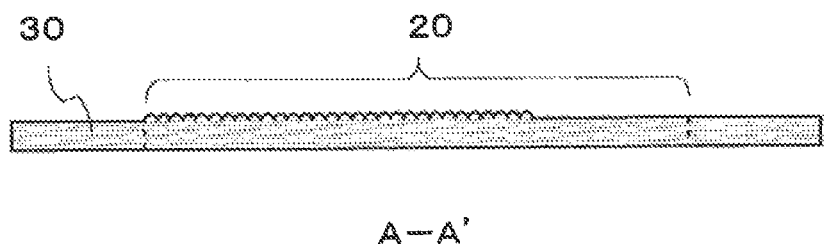
A–A'

FIG.3
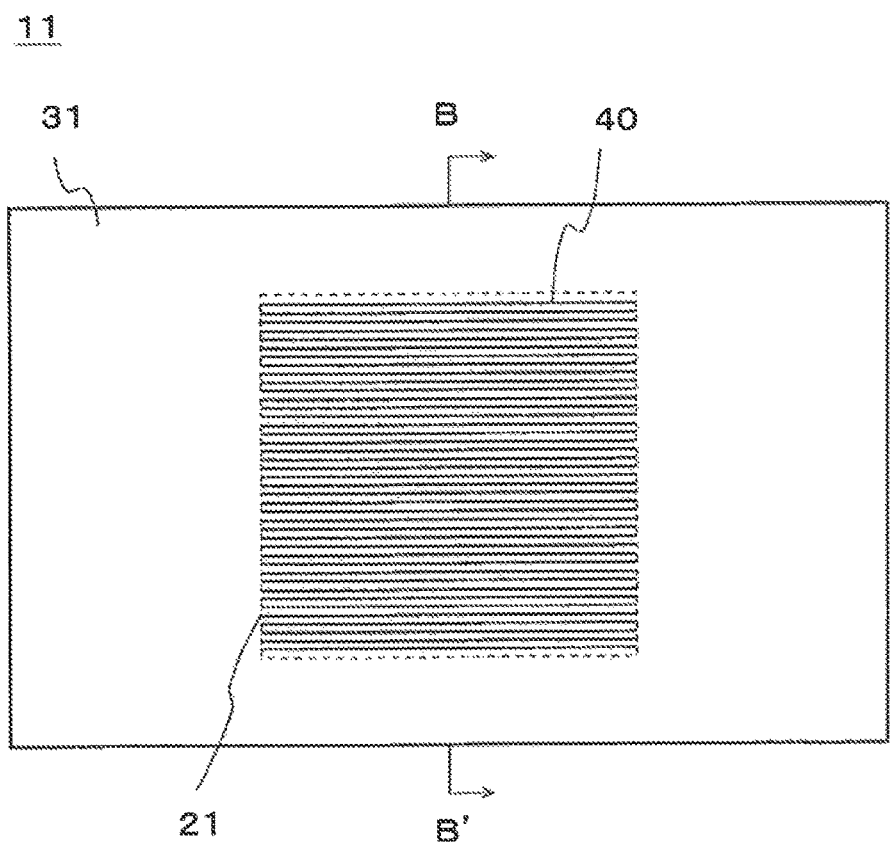
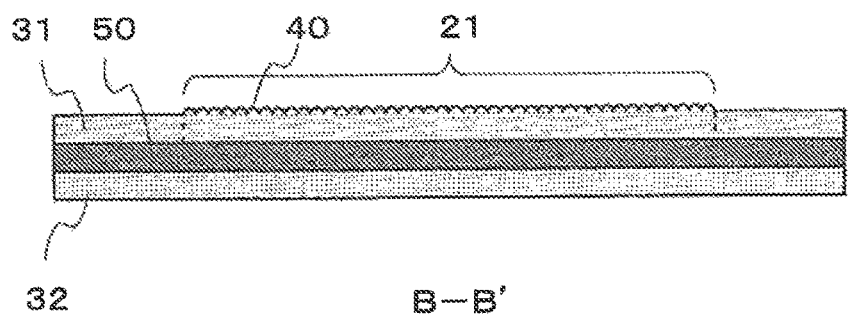

FIG.8
100
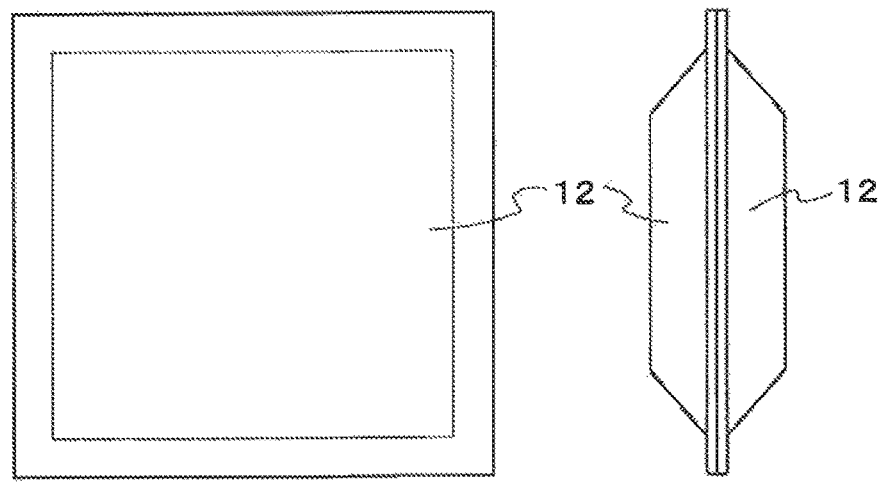
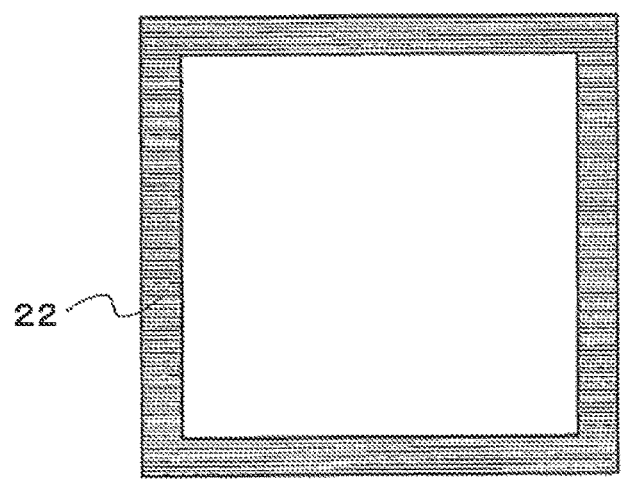

FILM, PACKAGING BAG USING THE FILM, AND METHOD OF IMPARTING HEAT SEALING PROPERTIES TO THE FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/002935, filed on Jun. 17, 2016, which is based upon and claims the benefit of priority of Japanese Patent Application No. 2015-136416, filed on Jul. 7, 2015, Japanese Patent Application No. 2015-169493, filed on Aug. 28, 2015, and Japanese Patent Application No. 2015-211035, filed on Oct. 27, 2015, the entireties of which are hereby incorporated by reference.

TECHNICAL FIELD

The art disclosed herein relates to a film, a packaging bag using the film and a method of imparting heat sealing properties to the film.

BACKGROUND ART

Biaxially stretched polyester films, such as a biaxially stretched polyethylene terephthalate film, have excellent strength, heat resistance, dimensional stability, chemical resistance, aroma retaining properties, and the like, and therefore are useful as materials for various packages. Therefore, packaging bags, such as flexible pouches, formed by heat-sealing such biaxially stretched polyester films with each other are expected to be produced. However, films having such orientation have poor heat sealing properties. In this regard, for example, Patent Literature 1 discloses a method of imparting heat sealing properties to a biaxially stretched polyester film by irradiating the surface of the film with short pulses of electromagnetic waves and modifying the surface.

CITATION LIST

Patent Literature

Patent Literature: JP H04-26339 B

SUMMARY OF THE INVENTION

Technical Problem

The method of short pulse irradiation disclosed in Patent Literature 1 requires generating short pulses of high output power using a xenon gas lamp and the like so as not to impair the internal orientation of the biaxially stretched polyester film. Such a high output power device has poor energy efficiency, and it is difficult to secure safety. Therefore, no efforts have been made toward practical use of a method of imparting heat sealing properties to a biaxially stretched polyester film. Further, no sufficient studies have been made for the physical conditions under which heat sealing properties are effectively imparted to a biaxially stretched polyester film.

The present invention was made in view of such problems, and has an object of providing a film effectively imparted with heat sealing properties using a relatively highly efficient and relatively highly safe method, and a packaging bag using the film.

Solution to Problem

One aspect of the present invention for solving the problem mentioned above is a film made up of a single layer of biaxially stretched polyester or made up of a laminate including a layer of biaxially stretched polyester at a surface, wherein the layer of biaxially stretched polyester includes a non-sealing portion having no heat sealing properties, and a sealing portion having heat sealing properties with lower crystallinity compared to that of the non-sealing portion.

Further, another aspect of the present invention is a packaging bag formed by mutually heat-sealing the sealing portions of one or more of the aforementioned films.

Yet another aspect of the present invention is a method of imparting heat sealing properties to a biaxially stretched polyester film including a step of imparting heat sealing properties to a predetermined region of a film made up of a single layer of biaxially stretched polyester or made up of a laminate including the layer of biaxially stretched polyester at a surface, by successively irradiating and scanning the layer of biaxially stretched polyester with laser light, and reducing crystallinity in the surface of the layer of biaxially stretched polyester in the predetermined region.

Advantageous Effects of the Invention

The present invention provides a film effectively imparted with heat sealing properties by using a relatively highly efficient and relatively highly safe method, and a packaging bag using the film.

BRIEF DESCRIPTION OF THE DRAWINGS

FIG. 1 is a set of diagrams showing a top view and a cross sectional view of a film according to an embodiment of the present invention.

FIG. 2 is a set of diagrams showing a top view and a cross sectional view of a method of producing a film.

FIG. 3 is a set of diagrams showing a top view and a cross sectional view of a laminated film according to an embodiment of the present invention.

FIG. 8 is a set of diagrams including a top view and a side view of a packaging bag, and a top view of a film used for producing the packaging bag, according to an embodiment of the present invention.

DESCRIPTION OF THE REPRESENTATIVE EMBODIMENTS

Figure 4:
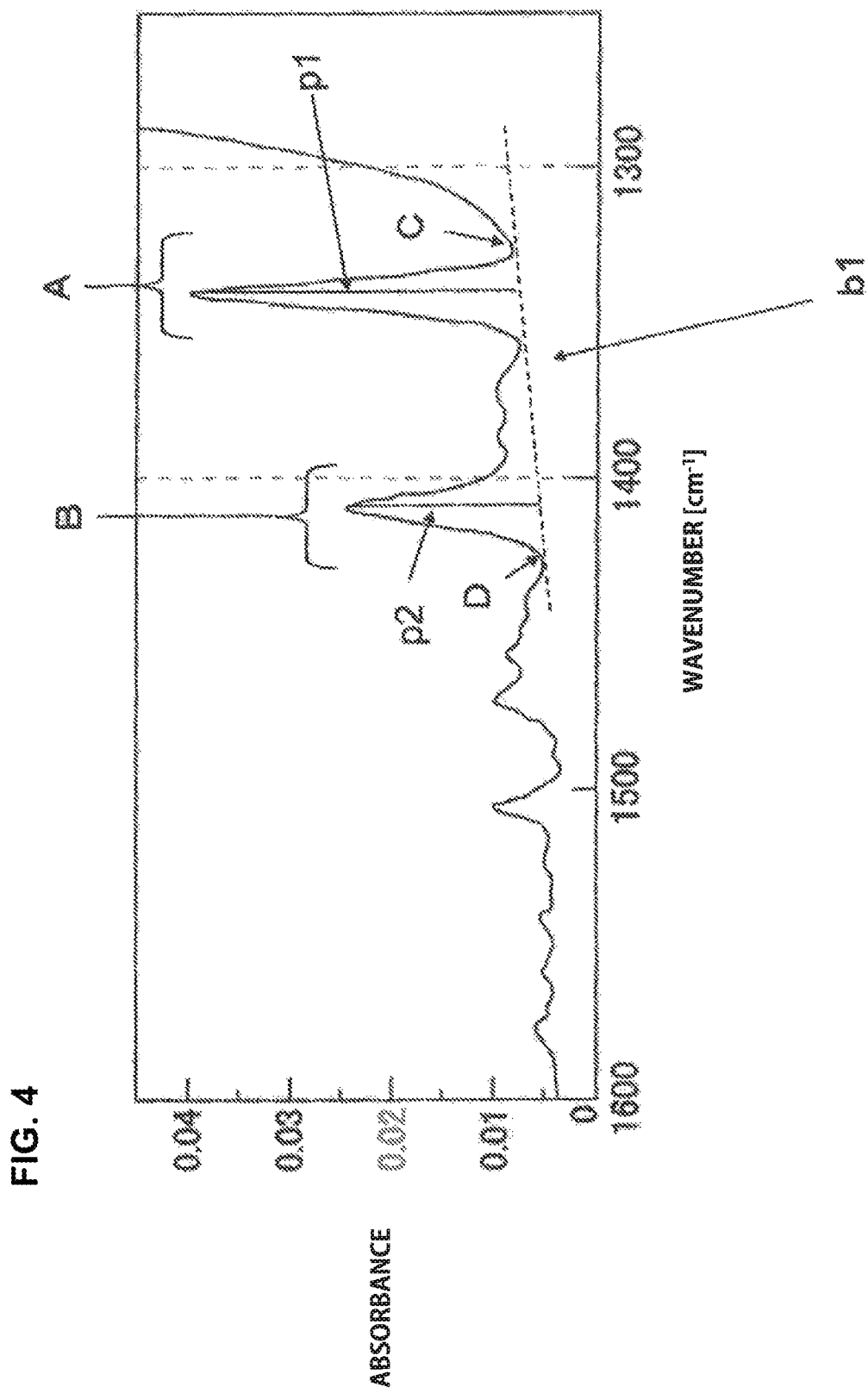
FIG. 4 shows an infrared absorption spectrum of a biaxially stretched polyester layer.

It is to be understood that the embodiments and Examples disclosed herein are intended to be representative of the present invention and that the present invention is not necessarily limited to these embodiment and Examples. One of ordinary skill in the art would be able to modify these embodiments and Examples in ways to still be within the scope of the present invention.

(Film)

FIG. 1 shows a top view of a film 10 and a cross sectional view thereof taken along the line A-A' according to an embodiment. The film 10 is made up of a single biaxially stretched polyester layer 30. The film 10 has a predetermined region 20 which is formed with a sealing portion 40 imparted with heat sealing properties by reducing crystallinity.

FIG. 2 shows a method of producing the film 10. The region 20 is successively irradiated and scanned with laser light to form the sealing portion 40. In the example shown in FIG. 2, laser light is irradiated such that an irradiating spot S of the laser light draws a plurality of parallel linear loci at predetermined intervals. The laser light to be used is preferably carbon dioxide gas laser light having an infrared wave length that easily allows the biaxially stretched polyester layer 30 to efficiently absorb energy. Other laser lights can also be used as long as the laser light has an infrared wave length.

The region 20 of the biaxially stretched polyester layer 30, which is irradiated with laser light, is heated up to or above the melting point by the irradiation of laser light, and cooled down to or below the melting point after irradiation to reduce crystallinity and develop heat sealing properties. The region 20 after scanning and irradiation of the laser light only needs to have its crystallinity reduced. Thus, as shown in the cross-sectional view of FIG. 1, the region 20 may be or may not be formed with a microstructure where a plurality of linear and parallel convex patterns are formed at predetermined intervals with the irradiation of laser light. Further, the shape of the irradiating spot of laser light and scanning loci may be optionally selected as appropriate.

In this way, the method of imparting heat sealing properties film with irradiation of laser light can achieve improved and even high energy efficiency and ensure improved or even high safety, compared to the method of imparting heat sealing properties with irradiation of high output electromagnetic waves of short pulses.

The biaxially stretched polyester layer 30 may have a thickness that is not particularly limited, and thus may have any thickness enabling shaping of polyester into a film. Such a thickness is generally 2 to 3 μm or more, but is not limited thereto. When the thickness is excessively large, it takes time to transfer sufficient heat to bonding interfaces at the time of heat-sealing, and therefore a film with an excessively large thickness is not practical for use as a packaging bag. Generally, the thickness is desirably 1,000 μm or less, but is not limited thereto. The thickness of the biaxially stretched polyester layer 30 can be adequately determined according to the purpose of use.

(Laminated Film)

Heat sealing properties can also be imparted to a laminated film containing biaxially stretched polyester at a surface thereof by irradiating laser light to the surface. FIG. 3 shows a top view of a laminated film 11 and a cross-sectional view thereof taken along the line B-B'. The laminated film 11 is a laminate including a biaxially stretched polyester layer 31 and other layers 50 and 32. The laminated film 11 has a predetermined region 21 where a sealing portion 40 is formed, being imparted with heat sealing properties by reducing crystallinity with irradiation of laser light to the biaxially stretched polyester layer 31. The other layers 50 and 32 may be an aluminum layer and a biaxially stretched polyester layer, respectively, but are not limited thereto. Materials and the number of layers are not particularly limited.

(Polyester)

The polyester used for the biaxially stretched polyester layers 30, 31 and 32 of the film 10 and the laminated film 11 is formed of a polymer containing an ester group obtained by a method of condensing dicarboxylic acid and diol components. Examples of the dicarboxylic acid include α,β-unsaturated dicarboxylic acids such as terephthalic acid, isophthalic acid, orthophthalic acid, 2,6-naphthalenedicarboxylic acid, biphenyl dicarboxylic acid, succinic acid, adipic acid, azelaic acid, sebacic acid, dodecane dicarboxylic acid, dimer acid, 1,4-cyclohexane dicarboxylic acid, 1,3-cyclohexane dicarboxylic acid, 1,2-cyclohexane dicarboxylic acid and its acid anhydrides, fumaric acid, maleic acid, maleic anhydride, itaconic acid, and citraconic acid; 2,5-norbornene dicarbon acid anhydride, tetrahydrophthalic anhydride, 2,5-norbornene dicarbon acid anhydride; and the like.

Further, examples of the diol include ethylene glycol, 1,2-propylene glycol, 1,3-propanediol, 1,4-butanediol, 1,5-pentanediol, neopentylglycol, 1,6-hexanediol, 3-methyl-1,5-pentanediol, 1,9-nonanediol, 2-ethyl-2-butylpropanediol, 1,4-cyclohexanedimethanol, diethylene glycol, triethylene glycol, dipropylene glycol, 2,2-bis(4-hydroxyethoxyphenyl) propane, ethylene glycol modified bisphenol A, and polyethylene glycol. As a matter of course, a copolymer obtained from 2 or more dicarboxylic acids or diols, and a copolymer obtained by further copolymerizing other monomers or polymers may also be used.

Specific examples include, but are not limited to, polyethylene terephthalate composed of terephthalic acid and ethylene glycol, polybutylene terephthalate composed of terephthalic acid and 1,4-thanediol, polyethylene naphthalate composed of 2,6-naphthalenedicarboxylic acid and ethylene glycol, polybutylene naphthalate composed of 2,6-naphthalenedicarboxylic acid and 1,4-butanediol, or a copolymer or a blend thereof.

(Crystallinity)

FIG. 4 shows an infrared absorption spectrum of a biaxially stretched polyethylene terephthalate layer as an example of the biaxially stretched polyester layer 30. As shown in FIG. 4, an infrared absorption peak A is found in the wavenumber range of 1,300 $cm^{-1}$ or more to 1,400 $cm^{-1}$ or less, in particular the wavenumber range of 1330 $cm^{-1}$ or more to 1360 $cm^{-1}$ or less. The wavenumber range is an absorption band corresponding to a trans conformation of a CH chain, the trans conformation being derived from a crystalline substance in the biaxially stretched polyester layer, and therefore the infrared absorption peak A has a strength p1 which is known to be correlated to the crystallinity of polyethylene terephthalate. Further, as shown in FIG. 4, another infrared absorption peak B is found in the wavenumber range of 1,390 $cm^{-1}$ or more to 1,430 $cm^{-1}$ or less of the infrared absorption spectrum. The infrared absorption peak B has a strength p2 which is known to be independent of the crystallinity of polyethylene terephthalate, and to exhibit almost a constant peak strength. Therefore, p1/p2, that is a value obtained by dividing the strength p1 of the peak A by the strength p2 of the peak B, serves as a rough indication of crystallinity in a biaxially stretched polyethylene terephthalate layer.

Therefore, the ratio of p1/p2 of the non-sealing portion not irradiated with laser light, to p1/p2 of the sealing portion 40 irradiated with laser light can be used as a scale for heat sealing properties developed in the heat sealing portion 40.

As shown in FIG. 4, when calculating the peak strengths p1 and p2, a bottom C on the lower wavenumber side of the peak A and a bottom D on the higher wavenumber side of the peak B are connected with a straight line, and the straight line is taken to be a baseline b1. The heights from the baseline b1 to the maximum points of the peaks are measured, and the values are taken to be the peak strengths p1 and p2.

When the value of p1/p2 of the non-sealing portion not irradiated with laser light is $I_1$, and the value of p1/p2 of the sealing portion 40 irradiated with laser light is $I_2$, $I_2$ is preferably 0% or more and 80% or less of $I_1$, as expressed by $0 \leq (I_2/I_1) \times 100 \leq 80$. When $I_2$ is more than 80% of $I_1$, the degree of crystallinity reduction of the sealing portion 40 is small and a sufficient sealing strength may not be developed. By permitting the value of p1/p2 of the sealing portion 40 to fall within this range, the crystallinity of the sealing portion 40 can be sufficiently reduced, thereby imparting adequate heat sealing properties to the film 10.

Alternatively, more simply, a ratio of the peak strength p1 at a peak wavenumber according to a trans conformation of a CH chain, to the peak strength p1 of the sealing portion 40 at the same peak wavenumber may be used as a scale for development of heat sealing properties of the sealing portion 40. In this case, the CH chain is derived from a crystalline substance in the biaxially stretched polyester layer in the wavenumber range of 1,300 cm-1 or more to 1,400 cm-1 or less of the non-sealing portion not irradiated with laser light.

That is to say, it is preferable that when the absorbance at the absorbance peak A in the wavenumber range of 1,300 $cm^{-1}$ or more to 1,400 $cm^{-1}$ or less of the non-sealing portion not irradiated with laser light is set to $I'_1$, and the absorbance of the sealing portion 40 at the peak A is set to $I'_2$, $I'_2$ is 0% or more to 80% or less of $I'_1$, as expressed by $0 \leq (I'_2/I'_1) \times 100 \leq 80$. When $I'_2$ is more than 80% of $I'_1$, the amount of crystallinity reduction of the sealing portion 40 is small and sufficient sealing strength cannot be developed. By permitting the peak value of the absorbance of the sealing portion 40 to fall within this range, the degree of crystallinity of the sealing portion 40 can be sufficiently reduced and adequate heat sealing properties can be imparted to the film 10.

Description so far has been provided, taking an example of using polyethylene terephthalate, but crystallinity can be assessed using similar means as long as polyester is used. The wavenumber band of the peak A correlated to crystallinity differs from the wavenumber band of the peak B independent of crystallinity, depending on the type of polyester used. A peak suitable for calculating crystallinity may be adequately selected depending on the type.

(Specific Viscosity)

Heat sealing properties are imparted to the biaxially stretched polyester layer 30 by reducing crystallinity of the surface thereof with irradiation of laser light.

Heat sealing properties can be favorably obtained by, for example, adequately selecting a specific viscosity of a polyester layer. Reasons for this can be inferred as follows. Heat sealing properties are imparted by reducing crystallinity of a polyester surface to easily cause entanglement between molecular chains of contacting interfaces at the time of heat sealing. The easier the entanglement is caused between molecular chains of contacting interfaces at the time of heat sealing, the larger the energy will be which is required to break the entanglement. Therefore, the strength of heat sealing would be enhanced. The likelihood of entanglement between molecular chains to occur is primarily dependent on the molecular weight of the molecular chains. Therefore, the lower the molecular weight is, the easier the molecular chains would move around, and thus, entanglement would easily occur. Specific viscosity is proportionate to a molecular weight, and the lower the specific viscosity is, the lower the molecular weight will be. Therefore, it is considered that, by lowering specific viscosity to some extent, molecular chains would be sufficiently entangled with each other at contacting interfaces at the time of heat sealing to exhibit preferable heat sealing properties.

However, it is not that simply reducing specific viscosity suffices. When specific viscosity is too low, the mechanical strength of the polyester is lowered, and therefore cohesion failure is likely to occur not at the interfaces but on the inside of the polyester at the time of breaking. Further, polyester with a low mechanical strength is not suitable for the material of a packaging bag.

To retain sufficient heat sealing strength and mechanical strength as a packaging material, it is preferable that the specific viscosity falls within the range of 0.50 or more to 0.70 or less. It is more preferable that the specific viscosity falls within the range of 0.60 or more to 0.68 or less.

The specific viscosity in this range can be achieved by permitting the molecular weight of polyester to fall within a given range.

(Crystallization Temperature)

Heat sealing properties are imparted to the biaxially stretched polyester layer 30 by reducing crystallinity of the surface thereof with irradiation of laser light. Heat sealing properties can be favorably obtained by, for example, adequately selecting a crystallization temperature of a portion irradiated with laser light.

Figure 5:
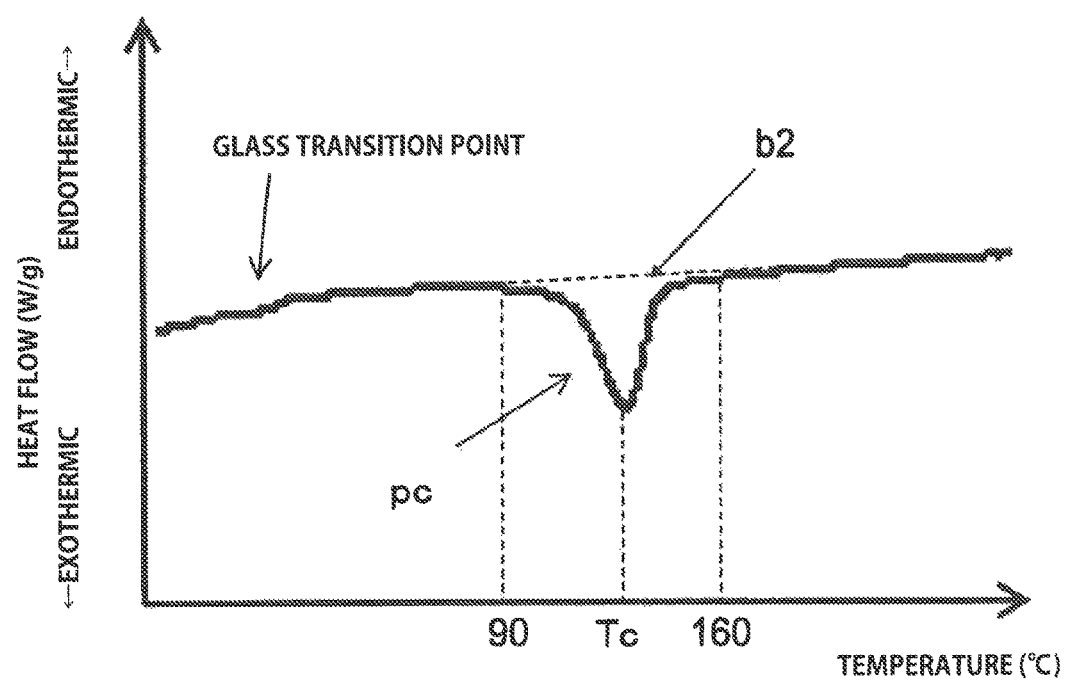
FIG. 5 shows a DSC curve of a biaxially stretched polyester layer.

FIG. 5 shows results of temperature increase measurements by using a biaxially stretched polyethylene terephthalate layer as an example of the biaxially stretched polyester layer 30, and by using a differential scanning calorimeter (DSC). The measurements were made with respect to a portion of the surface that had been non-crystallized with irradiation of laser light. As shown in FIG. 5, an exothermic peak pc associated with crystallization of the non-crystallized region is generated in the range of 90° C. to 160° C. A method of calculating the crystallization temperature using the DSC is shown in FIG. 5. It is preferable that measurements with the DSC are made with respect to a 10 mg polyethylene terephthalate sample in a temperature range of 0° C. to 300° C. at a temperature increase rate of 10° C./min. In the curve obtained, the exothermic peak pc of crystallization is generated when temperature is at a glass-transition point Tg or higher but is lower than a melting point Tm. The maximum distant point that is the crystallization exothermic peak pc from a baseline b2 is taken to be a crystallization peak temperature Tc. The exothermic peak pc is not necessarily one, but a plurality of exothermic peaks may be generated, in which case the temperature of the peak with the lowest temperature is taken to be Tc.

Heat sealing properties can be favorably obtained by adequately selecting the exothermic crystallization peak temperature Tc.

Figure 6:
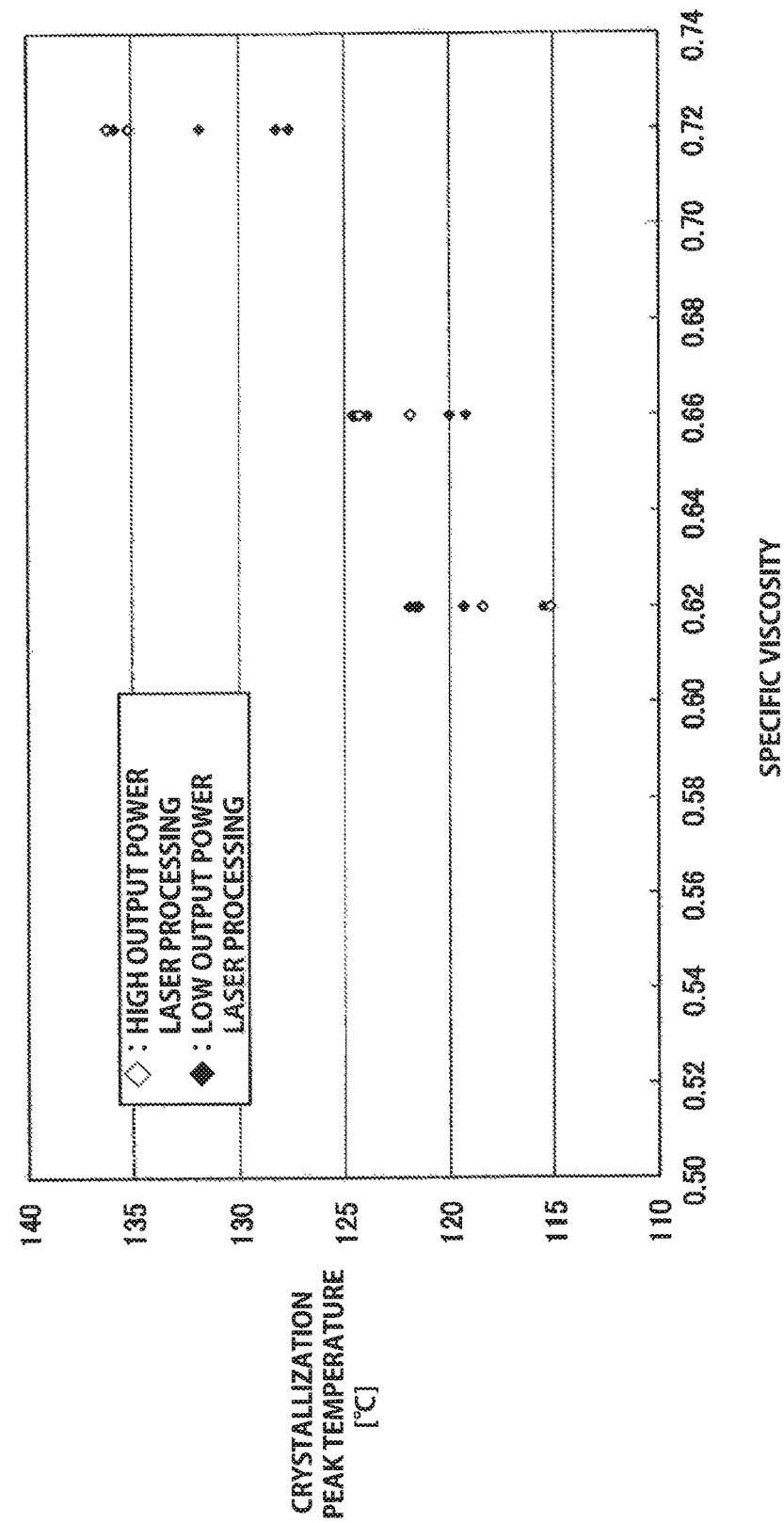
FIG. 6 shows a graph indicating a relationship between specific viscosity and crystallization peak temperature of polyester.

The exothermic crystallization peak temperature Tc of polyester was measured and its relation with specific viscosity was studied. The results are shown in FIG. 6. FIG. 6 is a graph showing relationship between the specific viscosity of a polyethylene terephthalate film and the exothermic temperature Tc under two predetermined laser processing conditions (high output power of 250 W and low output power of 10 W).

As shown in FIG. 6, when the laser processing conditions are unchanged, the crystallization peak temperature Tc exhibits a strong positive correlation with specific viscosity (i.e., molecular weight). Further, when the laser processing conditions are changed, the crystallization peak temperature Tc also changes. Further, when the results of the two laser processing conditions are combined, the crystallization peak temperature Tc and the specific viscosity show a correlation coefficient of 0.89 and a contribution ratio of 0.79. In this way, the crystallization peak temperature Tc and specific viscosity (i.e., molecular weight) of polyester have a significantly strong positive correlation.

Accordingly, the reasons why heat sealing properties change with the exothermic crystallization peak temperature Tc can be inferred as follows. The crystallization peak temperature Tc is considered to depend on the thermal stability and molecular weight of the non-crystallized region formed by laser processing. It is considered that the lower the thermal stability is, and also the lower the molecular weight is, the lower the peak temperature Tc becomes. Heat sealing properties can be imparted to the film by lowering the crystallinity of the polyester surface. However, the more the entanglement between molecular chains at contacting interfaces are likely to occur at the time of heat sealing, the larger the energy becomes which is required to break the entanglement. Therefore, the strength of heat sealing would be enhanced. The likelihood of entanglement between molecular chains to occur is associated with the molecular weight, and the stability of the non-crystallized region. Specifically, the lower the molecular weight is and the lower the stability is, the higher the mobility of the molecular chains becomes, and thus entanglements would easily occur. Therefore, it is considered that, by reducing the crystallization peak temperature Tc, molecular chains at the interfaces can be sufficiently entangled with each other and good heat sealing properties are exhibited.

However, it is not that simply reducing the crystallization peak temperature Tc suffices. When the crystallization peak temperature is too low, the molecular weight of polyester is small and the mechanical strength of the polyester is reduced. In such a case, cohesion failure is likely to occur not at the interfaces but on the inside of the polyester at the time of breaking. Further, polyester with a low mechanical strength is not suitable for the material of a packaging bag.

To retain sufficient heat sealing strength, it is preferable that the crystallization peak temperature Tc be in the range of 115° C. or more to 135° C. or less. The crystallization peak temperature can be permitted to fall within the range mentioned above by permitting the molecular weight of polyester to fall within a given range, and by adjusting the output power of laser processing.

(Enthalpy Relaxation)

When enthalpy relaxation proceeds, the sealing portion 40 may change its nature such that crystallization more rapidly proceeds at a temperature slightly above the glass-transition point. Therefore, during heat sealing, the sealing portion 40 may complete its crystallization before being brought into contact with the sealing portion 40 of another film, causing deterioration or disappearance of heat sealing properties.

To obtain sufficient heat sealing properties, the sealing portion 40 may preferably have an enthalpy relaxation amount ΔHr of 0 J/g or more and 50 J/g or less. When the enthalpy relaxation amount ΔHr exceeds 50 J/g, crystallization completes before the sealing portion 40 is brought into contact with the sealing portion 40 of another film, which may cause difficulty in performing heat sealing in a normal temperature range, or cause failure in developing sufficient sealing strength even when the portions are heat-sealed.

Figure 7A:
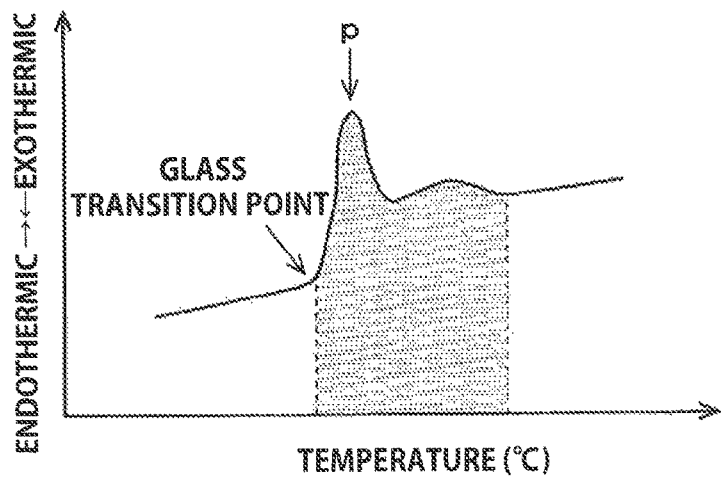
FIG. 7A is a schematic diagram of a differential scanning calorimetry analysis.
Figure 7B:
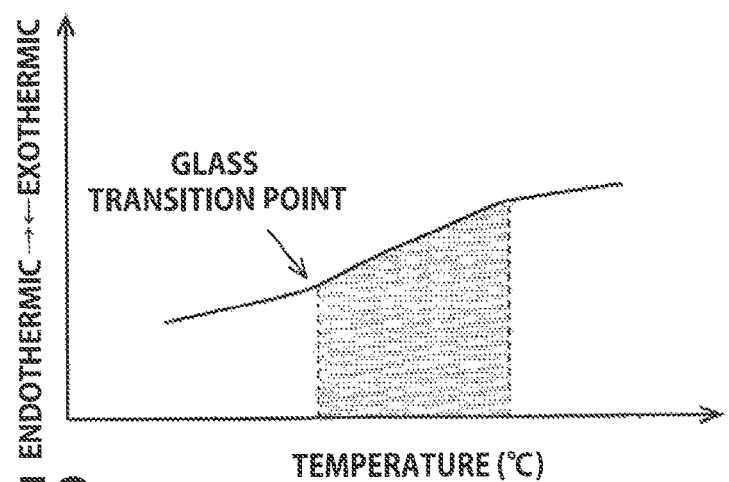
FIG. 7B is a schematic diagram of a differential scanning calorimetry analysis.
Figure 7C:
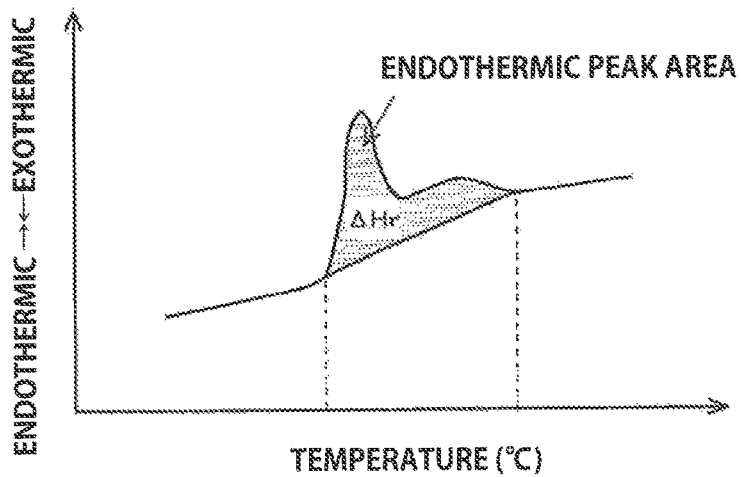
FIG. 7C is a schematic diagram of a differential scanning calorimetry analysis.

FIGS. 7A, 7B and 7C are schematic diagrams showing differential scanning calorimetry analysis (hereinafter referred to as DSC) of a film 10. FIG. 7A shows DSC in the vicinity of the endothermic peak p of the sealing portion 40. FIG. 7B shows DSC of the non-sealing portion of the same film 10 in the temperature range where the endothermic peak p is generated in the sealing portion 40. FIG. 7C shows the enthalpy relaxation amount ΔHr of the sealing portion 40 derived from the above DSCs. As shown in FIG. 7C, the enthalpy relaxation amount ΔHr is calculated from the endothermic peak area of the endothermic peak p which appears on the high temperature side of the glass-transition point. The endothermic peak area, that is, the enthalpy relaxation amount ΔHr, can be determined by comparing the heat quantity of the sealing portion 40 with the endothermic quantity of the non-sealing portion in the temperature range where the endothermic peak p is generated in the sealing portion 40. Specifically, the endothermic peak area can be determined by measuring the endothermic quantities of the sealing portion 40 and the non-sealing portion in the temperature range where the endothermic peak p is generated in the sealing portion 40, and calculating a difference between these endothermic quantities (the difference between the areas of the hatched portions of FIGS. 7A and 7B.

(Packaging Bag)

FIG. 8 shows a top view and a side view of a packaging bag 100 and a top view of a film 12 used for producing the packaging bag 100 according to an embodiment. The packaging bag 100 is a four-side seal bag produced by overlapping 2 films 12 such that regions 22 described later face each other, followed by heat sealing in the peripheral portions. The region 22 of the peripheral portion of each film 12 shown by hatching has been imparted with heat sealing properties with the method described above. The film 12 may be a single layer film such as the film 10, or may be a laminated film such as the film 11.

The packaging bag 100 is not limited to the type of four-side seal bag, but any type of seal bag may be used. For example, a three-side seal bag formed by folding a single film 12 in half and heat-sealing the overlapped peripheral portions, or a self-standing flexible packaging bag formed by placing a film 12 folded in half between two films 12 and sealing the peripheral portions, or the like can be used.

EXAMPLES

[Assessment 1]

The biaxially stretched polyester mentioned above is described by way of the following specific test examples, examples and comparative examples.

(Specific Viscosity Measurements)

A polyethylene terephthalate (PET) film was prepared as a sample. The polyethylene terephthalate film was measured out in an amount of 200 mg and heated to 90° C. and dissolved in a 20 ml mixed solvent in which phenol and 1,1,2,2-tetrachloroethane were mixed at a weight ratio of 40:60, thereby preparing a polyethylene terephthalate solution. After cooling the polyethylene terephthalate solution, efflux time $t_0$ of the mixed solvent and efflux time t of the polyethylene terephthalate solution were measured with an Ostwald viscometer. Then, the polyethylene terephthalate solution was adequately diluted with the mixed solvent, and efflux time t of the polyethylene terephthalate solution was measured for each of four points of concentration c of the polyethylene terephthalate solution. Then, $(t/t_0-1)$ was extrapolated using Math. 1 until the concentration c reached 0 to calculate a specific viscosity.

$$[\eta]=\lim_{c \to 0}\{(t/t_0-1)/c\} \quad \text{[Math. 1]}$$

In the Math. 1, $[\eta]$ is specific viscosity, t is efflux time of a polyethylene terephthalate solution, $t_0$ is efflux time of the mixed solvent, and c is the concentration [g/ml] of the solute.

(Mechanical Strength Measurement)

Mechanical strength of the polyethylene terephthalate film was measured with a tensile testing machine (RTC-1250 manufactured by Orientec Corporation). Tests were carried out at a tensile rate of 200 mm/min on test pieces each having a width of 10 mm and a length of 150 mm, with a distance between chucks being set to 100 mm to calculate average values of tensile strength [MPa] in the MD direction and TD direction.

(Laser Irradiation Conditions)

A predetermined region of the polyethylene terephthalate film was irradiated with laser light in an output power range of 10 W or more to 250 W or less using a laser device. The irradiated region, which was 100 mm×10 mm, was scanned with laser light such that an irradiation spot with a diameter of 0.14 mm was scanned drawing a plurality of parallel straight lines at a scanning rate of 1,000 mm/sec and at a scanning interval of 0.10 mm.

(DSC Measurement)

A polyethylene terephthalate film irradiated with laser light was prepared as a sample. From the film, the laser processed portion alone was measured out in an amount of 10 mg and enclosed in an aluminum pan, followed by measurements using a differential scanning calorimeter (Diamond DSC manufactured by PerkinElmer) under the conditions where temperature range was 0° C. to 300° C., temperature increase rate was 10° C./min, and nitrogen gas flow rate was 20 ml/min. Among the crystallization exothermic peaks generated in the range from 90° C. to 160° C. in the DSC curve obtained, the maximum distant point from the base line was taken to be a crystallization exothermic peak Tc.

(Surface Crystallinity Assessment)

A polyethylene terephthalate film irradiated with laser light was prepared as a sample. This film was subjected to infrared spectrometry using an ATR/FT-IR method, targeting the laser-processed portion and non-laser-processed portion of the surface. Measurements were made using an infrared spectroscopic device (FT/IR-6100 manufactured by JASCO Corporation) and using a single reflection germanium prism in the range of 4,000 $cm^{-1}$ to 600 $cm^{-1}$, with a resolution being 4 $cm^{-1}$ and the number of times of integration being 32. In the spectrum obtained, a peak p1 of absorbance in the wavenumber range of 1,330 $cm^{-1}$ or more to 1,360 $cm^{-1}$ or less, and a peak p2 of another absorbance in the wavenumber range of 1,390 $cm^{-1}$ or more to 1,430 $cm^{-1}$ or less were found, and a value of p1/p2 was calculated by dividing the strength of the peak p1 by the strength of the peak p2. The value of p1/p2 of the non-sealing portion not irradiated with laser light was taken to be $I_1$, and the value of p1/p2 of the sealing portion 40 irradiated with laser light was taken to be $I_2$, and the ratio of $I_2$ to $I_1$ was calculated.

(Heat Sealing Strength Measurement)

A polyethylene terephthalate film irradiated with laser light was prepared as a sample. Regions of the films irradiated with laser were permitted to face with each other and heat-sealed at a temperature of 140° C., imposing a load with a pressure of 0.2 MPa, for 2 seconds. Then, the sealing strength of the heat sealed regions was measured with a tensile testing machine. Measurements were made at a tensile rate of 300 mm/min and at a peel angle of 180° with respect to 15 mm width test pieces. The maximum load at peeling was taken to be the sealing strength.

Example 1-1

A polyethylene terephthalate film having a specific viscosity of 0.62 and a mechanical strength of 188 MPa was prepared as a base material. The film was laser processed at an output power of 10 W, using a carbon dioxide gas laser device having a maximum output power of 30 W. The ratio of $I_2$ to $I_1$ in the laser processed portion was 20/100. The obtained laser processed film was subjected to DSC measurements to find the crystallization peak temperature as being 121° C. The resultant film was measured for heat sealing strength which was found to have a good sealing strength of 10 N/15 mm.

Example 1-2

A polyethylene terephthalate film having a specific viscosity of 0.62 and a mechanical strength of 188 MPa was prepared as a base material. The film was laser processed at an output power of 250 W, using a carbon dioxide gas laser device having a maximum output power of 250 W. The ratio of $I_2$ to $I_1$ in the laser processed portion was 10/100. The obtained laser processed film was subjected to DSC measurement to find the crystallization peak temperature Tc as being 118° C. The resultant film was measured for heat sealing strength and found to have a good sealing strength of 15 N/15 mm.

Example 1-3

A polyethylene terephthalate film having a specific viscosity of 0.66 and a mechanical strength of 208 MPa was prepared as a base material. The film was laser processed at an output power of 10 W, using a carbon dioxide gas laser device having a maximum output power of 30 W. The ratio of $I_2$ to $I_1$ in the laser processed portion was 20/100. The obtained laser processed film was subjected to DSC measurement to find the crystallization peak temperature Tc as being 125° C. The resultant film was measured for heat sealing strength and found to have a good sealing strength of 6 N/15 mm.

Example 1-4

A polyethylene terephthalate film having a specific viscosity of 0.56 and a mechanical strength of 166 MPa was prepared as a base material. The film was laser processed at an output power of 10 W, using a carbon dioxide gas laser device having a maximum output power of 30 W. The ratio of $I_2$ to $I_1$ in the laser processed portion was 20/100. The obtained laser processed film was subjected to DSC measurement to find the crystallization peak temperature Tc as being 117° C. The resultant film was measured for heat sealing strength and found to have a good sealing strength of 4 N/15 mm.

Comparative Example 1-1

A polyethylene terephthalate film having a specific viscosity of 0.72 and a mechanical strength of 217 MPa was prepared as a base material. The film was laser processed at an output power of 10 W, using a carbon dioxide gas laser device having a maximum output power of 30 W. The ratio of $I_2$ to $I_1$ in the laser processed portion was 20/100. The obtained laser processed film was subjected to DSC measurement to find the crystallization peak temperature Tc as being 139° C. The resultant film was measured for heat sealing strength and found to have a poor sealing strength of 0 N/15 mm.

Comparative Example 1-2

A polyethylene terephthalate film having a specific viscosity of 0.48 and a mechanical strength of 132 MPa was prepared as a base material. The film was laser processed at an output power of 10 W, using a carbon dioxide gas laser device having a maximum output power of 30 W. The ratio of $I_2$ to $I_1$ in the laser processed portion was 20/100. The obtained laser processed film was subjected to DSC measurement to find the crystallization peak temperature Tc as being 112° C. The resultant film was measured for heat sealing strength and found to have a poor sealing strength of 1 N/15 mm.

The above results are shown in Table 1. In the "Decision" column, the mark "++" denotes that the heat sealing strength was particularly good when the heat sealing strength was 5 N/15 mm or more, the mark "+" denotes that the heat sealing strength was good when the heat sealing strength was less than 5 N/15 mm and 2 N/15 mm or more, and the mark "−" denotes that the film lacked required performance when the heat sealing strength was less than 2 N/15 mm.

TABLE 1

|  | Specific Viscosity | Mechanical Strength (MPa) | Laser Output Power | Crystallization Temperature (° C.) | Heat Sealing Strength (N/15 mm) | Assessment |
|---|---|---|---|---|---|---|
| Example 1-1 | 0.62 | 188 | Low | 121 | 10 | ++ |
| Example 1-2 | 0.62 | 188 | High | 118 | 15 | ++ |
| Example 1-3 | 0.66 | 208 | Low | 125 | 6 | ++ |
| Example 1-4 | 0.56 | 166 | Low | 117 | 4 | + |
| Comparative Example 1-1 | 0.72 | 217 | Low | 139 | 0 | − |
| Comparative Example 1-2 | 0.48 | 132 | Low | 112 | 1 | − |

The films of Examples 1-1 to 1-4 were confirmed to have sufficient heat sealing properties. In contrast, laminated films of Comparative Examples 1-1 and 1-2 did not develop heat sealing properties. Based on the above, it was confirmed that adequate sealing strength was developed when the specific viscosity was in the range of 0.50 or more to 0.70 or less, and thus the advantageous effects of the present invention were confirmed.

[Assessment 2]

Laminated films of Examples 2-1 to 2-7 and Comparative Examples 2-1 and 2-2 were prepared, and crystallinity, sealing strength, and survival rate of contents in the packaging body of each laminated film were measured.

A peripheral portion of a surface of each laminate including layers of polyethylene terephthalate (12 μm)/aluminum (7 μm)/polyethylene terephthalate (12 μm) in this order from the surface was irradiated with carbon dioxide gas laser light, thereby forming a laminated film for each of Examples 2-1 to 2-7 and Comparative Examples 2-1 and 2-2, having a sealing portion of different crystallinity in the surface of the polyethylene terephthalate layer. Then, an absorbance and an absorbance $I'_2$ were measured with FT-IR (Fourier transform infrared spectrophotometer) to calculate the ratio of $I'_2$ to $I'_2$. The absorbance represented one in an absorbance peak according to a trans conformation of a CH chain derived from the crystalline substance in a biaxially stretched polyester layer in the wavenumber range of 1,300 $cm^{-1}$ or more to 1,400 $cm^{-1}$ or less of the non-sealing portion in the surface of the polyethylene terephthalate later, and the absorbance $I'_2$ represented one in the sealing portion at the same peak wavenumber as in the non-sealing portion. The measurement with FT-IR was made using an ATR method and using a single reflection germanium (Ge) prism.

The prepared laminated films were each subjected to heat sealing processing for 2 seconds at 140° C. imposing a load of 0.2 MPa. Then, for each of the heat-sealed laminated films, sealing strength was measured for the heat sealed region using a tensile testing machine.

Further, using each heat-sealed laminated film, a packaging bag was prepared, which encapsulated tulobuterol as an example of contents easily adsorbed into polyester. The packaging bags were stored at 40° C. for 6 months, and an adsorption degree of the contents of each bag was measured by extracting methanol from the polyethylene terephthalate layer as an inner layer and by subjecting the extracted methanol to high-performance liquid chromatography to thereby calculate a survival rate of the contents.

The above results are shown in Table 2. In the "Sealability Assessment" column, the mark "+" denotes that the film had a sealing strength of 2 N/15 mm or more and had necessary sealing strength, and mark "−" denotes that the film had a sealing strength of less than 2 N/15 mm and lacked necessary sealing strength.

TABLE 2

|  | Absorbance I1/I2 (%) | Sealing Strength (N/15 mm) | Sealability Assessment | Contents Survival Rate (%) |
|---|---|---|---|---|
| Example 2-1 | 80 | 3 | + | 99.8 |
| Example 2-2 | 60 | 10 | + | 80.0 |
| Example 2-3 | 50 | 6 | + | 99.8 |
| Example 2-4 | 30 | 10 | + | 99.8 |
| Example 2-5 | 10 | 12 | + | 80.0 |
| Example 2-6 | 5 | 12 | + | 80.0 |
| Example 2-7 | 4 | 12 | + | 50.0 |
| Comparative Example 2-1 | 100 | 0 | − | — |
| Comparative Example 2-2 | 90 | 0 | − | — |

It was confirmed that the laminated films of Examples 2-1 to 2-7 had sufficient strength. In contrast, the laminated films of Comparative Examples 2-1 and 2-2 did not develop heat sealing properties. Based on the above, it was confirmed that adequate sealing strength was developed when $I'_2$ was 0% or more and 80% or less of and the effects of the present invention were exerted. Further, it was confirmed that the survival rate was 80% or more when I'$_2$ was 5% or more of I'$_1$, even when the contents were of easily adsorbed type.

[Assessment 3]

Films of Examples 3-1 to 3-15 and Reference Example 3-1 were prepared. These films had respective biaxially stretched polyethylene terephthalate layers of different enthalpy relaxation amount ΔHr and thickness. Sealing strengths of these films were measured.

Carbon dioxide gas laser light was irradiated to the peripheral portions of the surface of each film to prepare a film having a sealing portion. Then, the films were stored in a thermostatic bath at 60° C., and the enthalpy relaxation amount ΔHr of each film was adequately adjusted. The enthalpy relaxation amount ΔHr was measured using DSC with respect to 12 g of each film under the conditions of a temperature increase rate of 10° C./min.

The prepared laminated films were each heat-sealed by applying heat at 140° C. and imposing a load of 0.2 MPa for 2 seconds, followed by measuring sealing strength with a tensile testing machine.

Table 3 shows film thickness (μm), enthalpy relaxation amount ΔHr (J/g), sealing strength (N/15 mm), and sealability assessment of the films. In the "Sealability Assessment" column, the mark "+" denotes that the film had a sealing strength of 2 N/15 mm or more and had necessary sealing strength, and mark "−" denotes that the film had a sealing strength of less than 2 N/15 mm and lacked necessary sealing strength.

TABLE 3

| | Film Thickness (μm) | Enthalpy Relaxation Amount ΔHr (J/g) | Sealing Strength (N/15 mm) | Sealability Assessment |
|---|---|---|---|---|
| Example 3-1 | 2.5 | 0 | 10 | + |
| Example 3-2 | 12 | 2 | 8 | + |
| Example 3-3 | 12 | 3 | 8 | + |
| Example 3-4 | 12 | 5 | 7 | + |
| Example 3-5 | 25 | 2.5 | 8 | + |
| Example 3-6 | 25 | 3 | 8 | + |
| Example 3-7 | 38 | 3 | 8 | + |
| Example 3-8 | 50 | 3 | 8 | + |
| Example 3-9 | 50 | 5 | 7 | + |
| Example 3-10 | 100 | 3 | 8 | + |
| Example 3-11 | 100 | 10 | 5 | + |
| Example 3-12 | 200 | 20 | 4 | + |
| Example 3-13 | 300 | 25 | 4 | + |
| Example 3-14 | 500 | 25 | 4 | + |
| Example 3-15 | 500 | 50 | 2 | + |
| Reference Example 3-1 | 500 | 51 | 0 | − |

It was confirmed that the films of Examples 3-1 to 3-15 having an enthalpy relaxation amount ΔHr in the range of 0 J/g or more to 50 J/g or less had a sealing strength of 2 N/15 mm or more, and would provide sufficient sealing strength with the heat sealing in a normal temperature range. In contrast, the film of Reference Example 3-1 having an enthalpy relaxation amount ΔHr of more than 50 J/g did not develop sufficient heat sealing properties. The film of Reference Example 3-1 developed heat sealing properties of 2 N/15 mm when heat-sealed by applying heat at 180° C. and imposing a load of 0.3 MPa for 2 seconds. Thus, when performing heat sealing in a normal temperature range, the enthalpy relaxation amount ΔHr is preferably 50 J/g or less.

INDUSTRIAL APPLICABILITY

The present invention is useful for packaging bags and the like produced through heat sealing of films.

REFERENCE SIGNS LIST 10, 12 . . . Film; 11 . . . Laminated film; 20, 21, 22 . . . Region; 30, 31, 32 . . . Biaxially stretched polyester layer; 40 . . . Sealing portion; 50 . . . Aluminum layer; 100 . . . Packaging bag; A, B . . . Infrared absorption peak; C, D . . . Bottom of infrared absorption peak; b1 . . . Baseline of infrared absorption spectrum; p1, p2 . . . Peak strength; pc . . . Exothermic peak of DSC curve; b2 . . . Baseline of DSC curve; Tc . . . Exothermic peak temperature; S . . . Spot

What is claimed is:

1. A film made up of a single layer of biaxially stretched polyester or made up of a laminate including a layer of biaxially stretched polyester at a surface, wherein the layer of biaxially stretched polyester includes a non-sealing portion having no heat sealing properties, and a sealing portion having heat sealing properties with lower crystallinity compared to that of the non-sealing portion, wherein the layer of biaxially stretched polyester has a specific viscosity in a range of 0.62 or more to 0.66 or less.

2. The film of claim 1, wherein the sealing portion has a crystallization peak temperature in a range of 118° C. or more to 125° C. or less as measured by differential scanning calorimetry.

3. The film of claim 1, wherein the polyester is polyethylene terephthalate.

4. A packaging bag formed by mutually heat-sealing the sealing portions of one or more of the films of claim 1.

5. A method of imparting heat sealing properties to a film, comprising, a step of imparting heat sealing properties to a predetermined region of a film made up of a single layer of biaxially stretched polyester or made up of a laminate including the layer of biaxially stretched polyester at a surface, by successively irradiating and scanning the layer of biaxially stretched polyester with laser light, and reducing crystallinity in the surface of the layer of biaxially stretched polyester in the predetermined region, wherein the layer of biaxially stretched polyester has a specific viscosity in a range of 0.62 or more to 0.66 or less.

6. The method of imparting heat sealing properties to a film of claim 5, wherein, in the step of imparting heat sealing properties, the laser light is so irradiated that crystallization peak temperature of the layer of biaxially stretched polyester measured by differential scanning calorimetry falls in a range of 118° C. or more to 125° C. or less.

7. The method of imparting heat sealing properties to a film of claim 5, wherein the polyester is polyethylene terephthalate.

* * * * *